US010812350B2

(12) United States Patent
Bugge et al.

(10) Patent No.: US 10,812,350 B2
(45) Date of Patent: Oct. 20, 2020

(54) SYSTEM MONITORING DEVICE

(71) Applicant: Silicon Laboratories Inc., Austin, TX (US)

(72) Inventors: Audun Bugge, Oslo (NO); Daymon Rogers, Pflugerville, TX (US); Jørn Norheim, Oslo (NO); Øivind Loe, Austin, TX (US); Raman Sharma, Austin, TX (US); Timotej Ecimovic, Hull, MA (US); Tom Zudock, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 292 days.

(21) Appl. No.: 15/848,221

(22) Filed: Dec. 20, 2017

(65) Prior Publication Data

US 2019/0190788 A1    Jun. 20, 2019

(51) Int. Cl.
*H04L 12/26* (2006.01)
*H04L 12/24* (2006.01)
*G06F 11/30* (2006.01)
*G06F 1/3212* (2019.01)
*G06F 11/36* (2006.01)

(52) U.S. Cl.
CPC .......... *H04L 43/045* (2013.01); *G06F 1/3212* (2013.01); *G06F 11/3003* (2013.01); *G06F 11/3051* (2013.01); *G06F 11/3062* (2013.01); *G06F 11/3636* (2013.01); *H04L 41/085* (2013.01); *H04L 41/14* (2013.01); *H04L 41/22* (2013.01); *H04L 43/08* (2013.01); *H04L 43/0817* (2013.01)

(58) Field of Classification Search
CPC ..... H04L 43/045; H04L 43/08; H04L 41/085; H04L 43/0817; H04L 41/14; H04L 41/22; G06F 11/3062; G06F 11/3051; G06F 1/3212; G06F 11/3003; G06F 11/3636
See application file for complete search history.

(56) References Cited

U.S. PATENT DOCUMENTS 6,205,555 B1 * 3/2001 Kageshinna ........ G06F 11/3447
713/300
9,032,129 B2    5/2015 Færevaag
(Continued)

OTHER PUBLICATIONS

ARM Limited, "ARM 720T: Technical Reference Manual", Section 9.18, 2004, www.arm.com (Year: 2004).*
(Continued)

*Primary Examiner* — Ramy M Osman
(74) *Attorney, Agent, or Firm* — Nields, Lemack & Frame, LLC

(57) ABSTRACT

A system and method for gathering and displaying various types of information for a plurality of network devices is disclosed. A system monitoring device is in communication with a plurality of network devices. Each of these network devices transmits information related to power consumption, network activity and/or program execution to the system monitoring device. The system monitoring device stores all of this information and presents it to the user in a manner that allows for investigation of anomalies, power surges and other issues. The system monitoring device may connect to each of the network devices using a wired connection, such as Ethernet or USB.

28 Claims, 10 Drawing Sheets

(56) References Cited

U.S. PATENT DOCUMENTS

| | | | | |
|---|---|---|---|---|
| 9,223,366 B2* | 12/2015 | Kida | | G06F 1/3206 |
| 2003/0191986 A1* | 10/2003 | Cyran | | G06F 11/3062 |
| | | | | 714/32 |
| 2004/0025068 A1* | 2/2004 | Gary | | G06F 1/26 |
| | | | | 713/300 |
| 2005/0116836 A1* | 6/2005 | Perry | | H04Q 9/00 |
| | | | | 340/870.02 |
| 2006/0031447 A1* | 2/2006 | Holt | | H04L 63/18 |
| | | | | 709/223 |
| 2007/0094527 A1* | 4/2007 | Frietsch | | G06F 1/266 |
| | | | | 713/340 |
| 2009/0083588 A1* | 3/2009 | Yamashita | | G06F 11/0748 |
| | | | | 714/47.1 |
| 2010/0146316 A1* | 6/2010 | Carter | | G06F 1/3203 |
| | | | | 713/322 |
| 2010/0149028 A1* | 6/2010 | Mermet | | G01S 5/0027 |
| | | | | 342/357.31 |
| 2010/0205471 A1* | 8/2010 | Vavilala | | H04L 12/12 |
| | | | | 713/340 |
| 2010/0229016 A1* | 9/2010 | Kodama | | H04L 43/08 |
| | | | | 713/340 |
| 2013/0047003 A1* | 2/2013 | Koesler | | G06F 11/3062 |
| | | | | 713/300 |
| 2013/0314073 A1* | 11/2013 | Nebu | | G06Q 50/06 |
| | | | | 324/103 R |
| 2014/0004829 A1* | 1/2014 | Rieger | | H04W 12/1208 |
| | | | | 455/411 |
| 2015/0137792 A1* | 5/2015 | Filippi | | G01D 4/00 |
| | | | | 324/76.11 |
| 2016/0033985 A1* | 2/2016 | Gulli' | | G05F 1/66 |
| | | | | 700/295 |
| 2018/0123892 A1* | 5/2018 | Mellquist | | H04L 41/12 |
| 2018/0329466 A1* | 11/2018 | Calinov | | G06F 1/26 |
| 2019/0190788 A1* | 6/2019 | Bugge | | H04L 41/14 |
| 2019/0245763 A1* | 8/2019 | Wu | | H04L 41/06 |

OTHER PUBLICATIONS

"Measure Energy Impact with Instruments," Apple Inc., accessed Mar. 20, 2018, https://developer.apple.com/library/content/documentation/Performance/Conceptual/EnergyGuide-iOS/MonitorEnergyWithInstruments.html.

* cited by examiner

FIG. 9

SYSTEM MONITORING DEVICE

This disclosure describes systems and methods allowing the activity and power consumption of a plurality of devices to be monitored.

BACKGROUND

Recently, more networks have been constructed using low-power devices. In some cases, these low-power devices are battery operated. These network devices include a processing unit, a network interface, and other circuitry.

As the processing unit executes its instructions, the power consumption of the network device may vary. In other words, the instructions being executed by the processing unit may vary the power consumption of the processing unit, or the associated components. Thus, power consumption may be a function of the instructions being executed by the processing unit.

Further, when the network device activates certain functions, such as transmitting a packet via the network interface, the power consumption of the network device may increase. The radio interface of the network interface is typically a higher-power component. Therefore, understanding the activity of the network interface may assist in understanding the power consumption of the network device.

While the power consumption of individual network devices is important, it may also be important to understand the power consumption of all of the devices in the network. For example, overall power consumption of the entire network may be of interest.

Consequently, monitoring the power consumed by a plurality of network devices for the purpose of identifying intervals of higher power consumption is important. Therefore, it would be advantageous if there were a system and method that allows the power consumption of a plurality of devices to be monitored. Further, it would be beneficial if that power consumption could be correlated with other activities, such as the instruction being executed, or network activity.

SUMMARY

A system and method for gathering and displaying various types of information for a plurality of network devices is disclosed. A system monitoring device is in communication with a plurality of network devices. Each of these network devices transmits information related to power consumption, network activity and/or program execution to the system monitoring device. The system monitoring device stores all of this information and presents it to the user in a manner that allows for investigation of anomalies, power surges and other issues. The system monitoring device may connect to each of the network devices using a wired connection, such as Ethernet or USB.

According to one embodiment, a system for displaying information about a plurality of devices is disclosed. The system comprises the plurality of devices, where each device comprises a network interface in communication with a debug network; and a system monitoring device, in communication with each of the plurality of devices via the debug network, and comprising a display; wherein each device periodically measures its power consumption and transmits the power consumption information to the system monitoring device via the debug network; and the system monitoring device displays power consumption information for at least two of the plurality of devices on the display. In certain embodiments, a trigger condition may be set in the system monitoring device, such that when the trigger condition is met, the system monitoring device performs an action. The action may comprise starting to store the power consumption information, displaying the power consumption information, or ceasing to store the power consumption information. In some embodiments, all power consumption information is stored in a temporary file such that information that is not visible on the display can be retrieved. In some embodiments, each device generates program execution information by monitoring the program counter of a processing unit, and transmits the program execution information to the system monitoring device via the debug network. In some embodiments, the system monitoring device also displays program execution information for at least one of the plurality of devices on the display. In some embodiments, the devices transmit network logs to the system monitoring device using the debug network. In certain embodiments, the system monitoring device also displays network activity for at least one of the plurality of devices on the display.

According to another embodiment, a system monitoring device is disclosed. The system monitoring device comprises a network interface to communicate with a plurality of devices; a display; and a processing unit, wherein the system monitoring device receives power consumption information from the plurality of devices via the network interface, and displays the power consumption information from at least two of the plurality of devices on the display. In certain embodiments, the system monitoring device comprises a memory device, the memory device containing software applications. In one embodiment, the software applications comprise a multi-mode Energy Profiler, a Network Analyzer and a Debugger.

According to another embodiment, a software application is disclosed. The software application comprises instructions which when executed by a processing unit, enable a system monitoring device to: receive power consumption information from a plurality of devices via a network interface; receive network activity logs from the plurality of devices via the network interface; receive program execution information from the plurality of devices via the network interface; and display the power consumption information from at least two of the plurality of devices on a display. In certain embodiments, the instructions enable the system monitoring device to display program execution information on the display. In certain embodiments, the instructions enable the system monitoring device to display network activity on the display.

BRIEF DESCRIPTION OF THE DRAWINGS

For a better understanding of the present disclosure, reference is made to the accompanying drawings, in which like elements are referenced with like numerals, and in which:

FIG. 9 shows a screen shot of the Debugger according to one embodiment.

DETAILED DESCRIPTION

Figure 1:
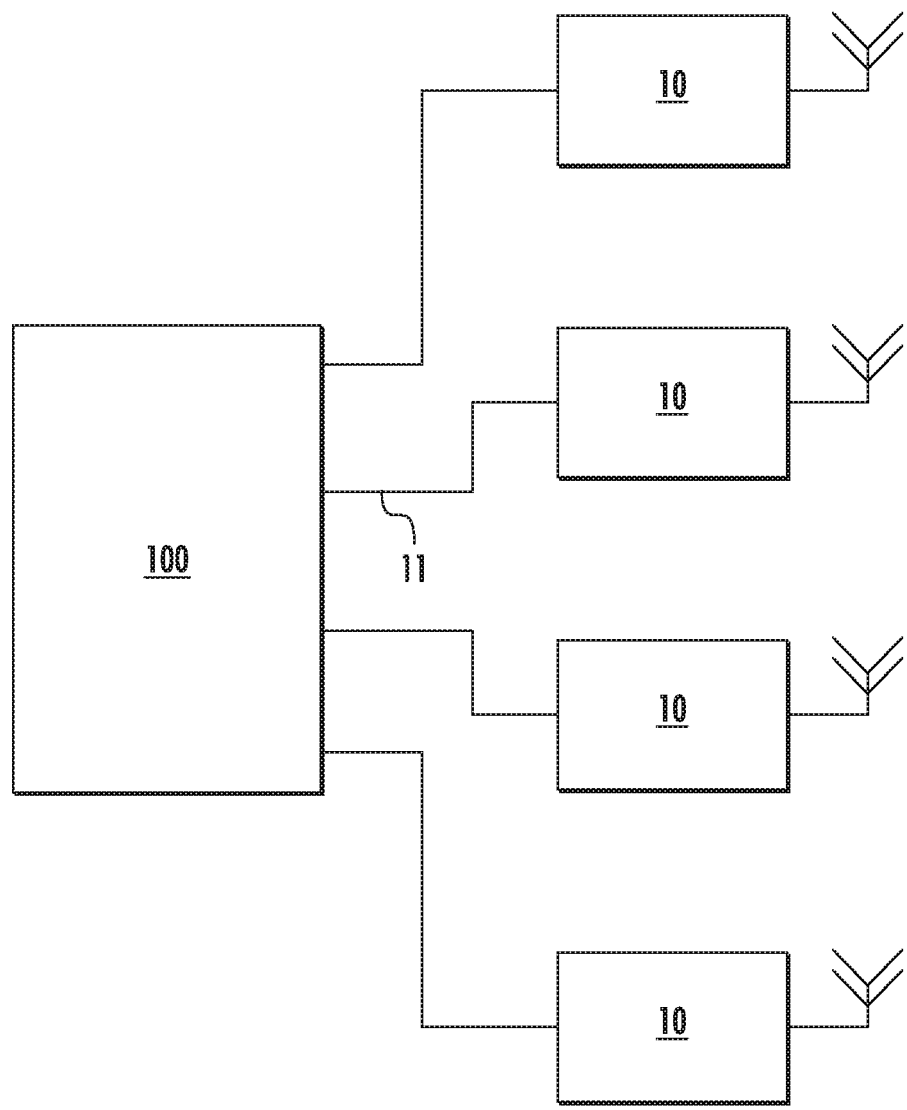
FIG. 1 is a block diagram of a plurality of network devices in communication with a system monitoring device.

FIG. 1 shows a plurality of network devices 10 in communication with a system monitoring device 100. The plurality of network networks may form a wireless network, in which the plurality of network devices 10 communicate with each other. In other embodiments, the network devices 10 may each be members of different wireless networks. The network devices 10 may communicate with the system monitoring device 100 using a wired interconnect 11, such as USB or Ethernet. The system monitoring device 100 receives information from each of the network devices 10 via the wired interconnect 11. As described in more detail below, the system monitoring device 100 uses this information to visually display pertinent power consumption and activity data to a user. Although the present disclosure describes the interconnect between the network device 10 and the system monitoring device 100 as being wired, in certain embodiments, a wireless interconnect may be used.

Figure 2:
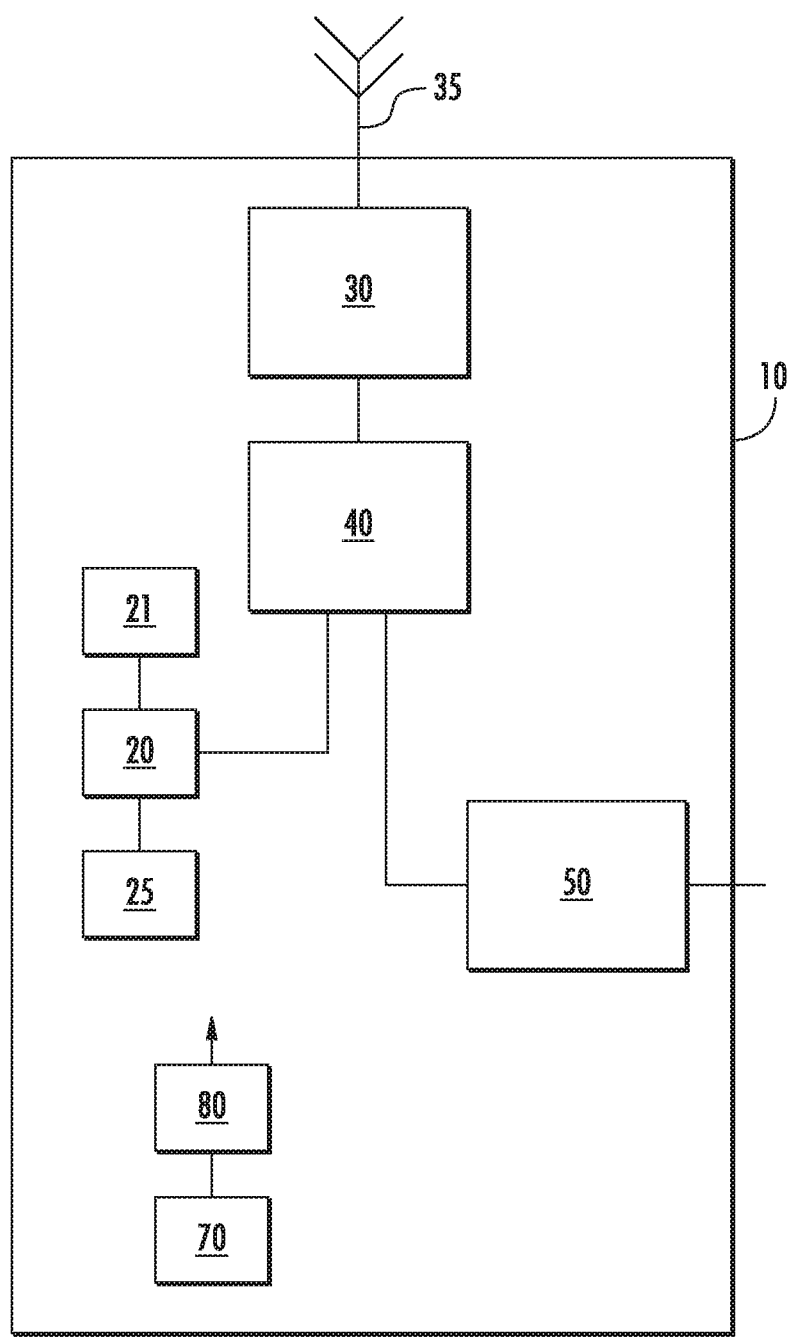
FIG. 2 shows a block diagram of the internal architecture of a network device according to one embodiment.

FIG. 2 shows a block diagram of a representative network device 10. The network device 10 has a processing unit 20 and an associated memory device 25. This memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

The network device 10 also includes a wireless network interface 30, which may include an antenna 35. The network interface may support any wireless network protocol, such as DotDot, ZIGBEE®, Thread, WIFI, Bluetooth®, or others. In this disclosure, the wireless network interface 30 may be referred to as the primary network interface.

The network device 10 may include a second memory device 40 in which data that is received by the wireless network interface 30, and data that is to be transmitted by the wireless network interface 30, is stored. This second memory device 40 is traditionally a volatile memory. The processing unit 20 has the ability to read and write the second memory device 40 so as to communicate with the other nodes in the network.

The network device 10 also has a power source 70, which may be a battery or a connection to a permanent power source, such as a wall outlet.

The network device 10 may also include a second network interface 50. This second network interface 50 may support a wired connection to the system monitoring device 100. This wired connection may be an Ethernet connection, a USB connection, or another protocol. In certain embodiments, the wired connection may be referred to as the secondary network or the debug network.

The network device 10 may include a power monitoring module disposed between the power source 70 and the electronics disposed in the network device 10. The power monitoring module may include a sense resistor, through which all of the current passes. The voltage measured across this sense resistor can be used to determine the current used by the network device 10. In addition, the voltage measured at either terminal of the sense resistor may be indicative of the voltage used by the network device 10. Thus, the power of the network device 10 may be calculated by multiplying the measured current by the measured voltage. The sense resistor may be a discrete component, or may be integrated into other components on the network device 10.

In some embodiments, the processing unit 20 may be an ARM processor that includes an enhanced trace macrocell (ETM). The ETM allows visibility to the internal operation of the processing unit 20. For example, the program counter may be continuously transmitted via the ETM to the exterior of the processing unit 20. The ETM may be in communication with a trace module 21 which receives the output from the ARM processor and saves this information.

In yet other embodiments, the processing unit 20 may not be an ARM processor. In these embodiments, the trace module 21 may be in communication with a debug port or other interface on the processing unit 20, which allows visibility to the operation of the processing unit 20. The information collected by the trace module may be referred to as program execution information.

The trace module 21 may be in communication with the processing unit 20, the second memory device 40 or the second network interface 50. In this way, information stored in the trace module 21 can be transmitted over the debug network.

Figure 3:
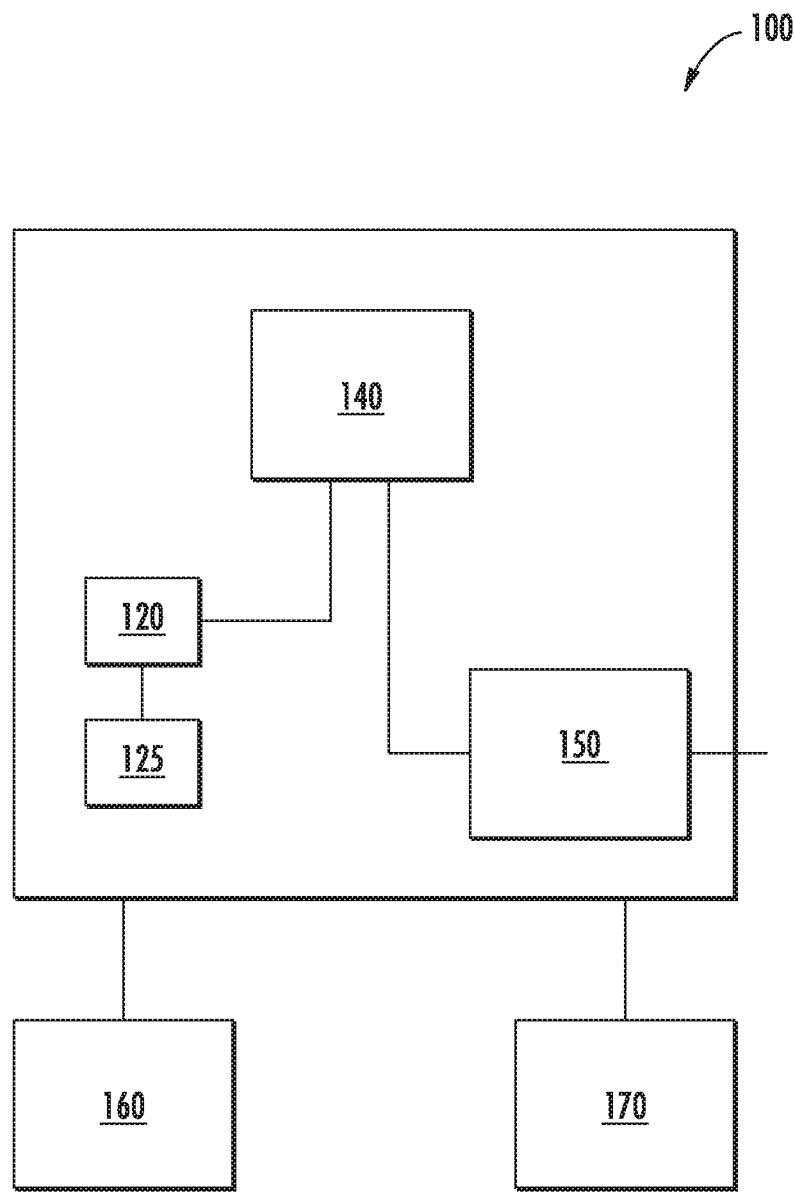
FIG. 3 shows a block diagram of the internal architecture of the system monitoring device according to one embodiment.

FIG. 3 shows a representative block diagram of the system monitoring device 100. In certain embodiments, the system monitoring device 100 may be a personal computer, although other embodiments are also possible. The system monitoring device 100 includes a processing unit 120 and an associated memory device 125. This memory device 125 contains the instructions, which, when executed by the processing unit 120, enable the system monitoring device 100 to perform the functions described herein. This memory device 125 may also contain the software applications described herein. This memory device 125 may be a non-volatile memory, such as a FLASH ROM, an electrically erasable ROM or other suitable devices. In other embodiments, the memory device 125 may be a volatile memory, such as a RAM or DRAM.

The system monitoring device 100 may also include a network interface 150. This network interface 150 may support a wired connection to each of the network devices 10. This wired connection may be an Ethernet connection, a USB connection, or another protocol. In certain embodiments, this wired connection may be referred to as the secondary network or the debug network. As noted above, although the debug network is described as being a wired connection, in certain embodiments, a wireless connection may be used.

The system monitoring device 100 includes a second memory device 140 in which data that is received by the network interface 150, and data that is to be transmitted by the network interface 150, is stored. This second memory device 140 is traditionally a volatile memory. The processing unit 120 has the ability to read and write the second memory device 140 so as to receive information from the network devices 10 via the network interface 150.

Although not shown, the system monitoring device 100 also has a power source, which may be a battery or a connection to a permanent power source, such as a wall outlet.

The system monitoring device 100 has a display 160 that allows a user to view information gathered by the system monitoring device 100. This display 160 may be a touchscreen, a video monitor, or another type of visual display device.

The system monitoring device 100 may also include an input device 170, such as a keyboard, mouse or touchscreen. The input device 170 allows a user to provide inputs to the system monitoring device 100. In certain embodiments, the input device 170 and the display 160 may be the same device, such as a touchscreen.

The interaction between the user, the display 160 and the input device 170 will be described in more detail below.

In normal operation, each network device 10 may sample the voltage measured across the sense resistor in the power monitoring module 80. In some embodiments, the network device 10 also samples the voltage at one of the terminals of the sense resistor. In certain embodiments, the network device 10 computes the instantaneous power consumed by the network device 10. This sampling may be performed at a regular interval, such as at a sampling frequency of 10 kHz. In certain embodiments, the sampling frequency may be as high as 100 kHz. Each network device 10 may then transmit this power consumption information to the system monitoring device 100 using the debug network. This power consumption information may be accompanied by a timestamp so that the power consumption information is correlated to a specific point in time.

In certain embodiments, the network devices 10 each continuously transmit this power consumption information at regular intervals to the system monitoring device 100. In other embodiments, the system monitoring device 100 may provide an indication to each network device 10 as to whether the power consumption information is to be transmitted to the system monitoring device 100. For example, if the debug network is bandwidth limited, the system monitoring device 100 may request power consumption information only from those network devices that the user is viewing on the display 160.

During normal operation, the network device 10 may also sample the program counter or other information from the processing unit, as saved or provided by the trace module 21. The network devices 10 may each transmit their program execution information to the system monitoring device 100 via the debug network. This program execution information may be transmitted at regular intervals, such as at a frequency of 10 kHz. In other embodiments, the system monitoring device 100 may provide an indication to each network device 10 as to whether the program execution information is to be transmitted to the system monitoring device 100. For example, if the debug network is bandwidth limited, the system monitoring device 100 may request the program execution information only from those network devices that the user is viewing on the display 160. The program execution information may also be accompanied by a timestamp, so that the execution of the processing unit can be correlated with other activities.

In certain embodiments, the network device 10 may also maintain a log of network activity. For example, each time the network device 10 receives a packet on the wireless network interface 30, the network device may add an entry to the network log. This entry may include the time that the packet was received, the source address of the packet, the length of the packet and the type of packet that was received. Similarly, when the network device 10 attempts to transmit a packet using the wireless network interface 30, an entry is made in the network log. This entry may include the time that the packet was transmitted, the destination address of the packet, the length of the packet and the type of packet that was transmitted. In certain embodiments, more information may be stored for transmissions. For example, an entry may be included for each retry or unsuccessful transmission. Each of these entries may also be accompanied by a timestamp.

In some embodiments, each network device 10 may transmit its network log to the system monitoring device 100 at regular intervals via the debug network. In certain embodiments, the system monitoring device 100 may request that a particular network device 10 transmit its network logs. In certain embodiments, to save space in the memory device, once the network log has been transmitted to the system monitoring device 100, the network device 10 deletes its local copy of the network log.

In many networks, a clock synchronization process is defined. In this way, all devices on that network utilize the same time. Thus, timestamps from one network device correspond to timestamps from a second network device 10.

In normal operation, the system monitoring device 100 may have information from a plurality of network devices 10 that represent power consumption information, program execution information and network logs.

The system monitoring device 100 has the capability to display any or all of this data on the display 160. Furthermore, because the data that the system monitoring device 100 received is accompanied by timestamps, the system monitoring device 100 is able to correlate power consumption information with program execution information and network activity.

Figure 4:
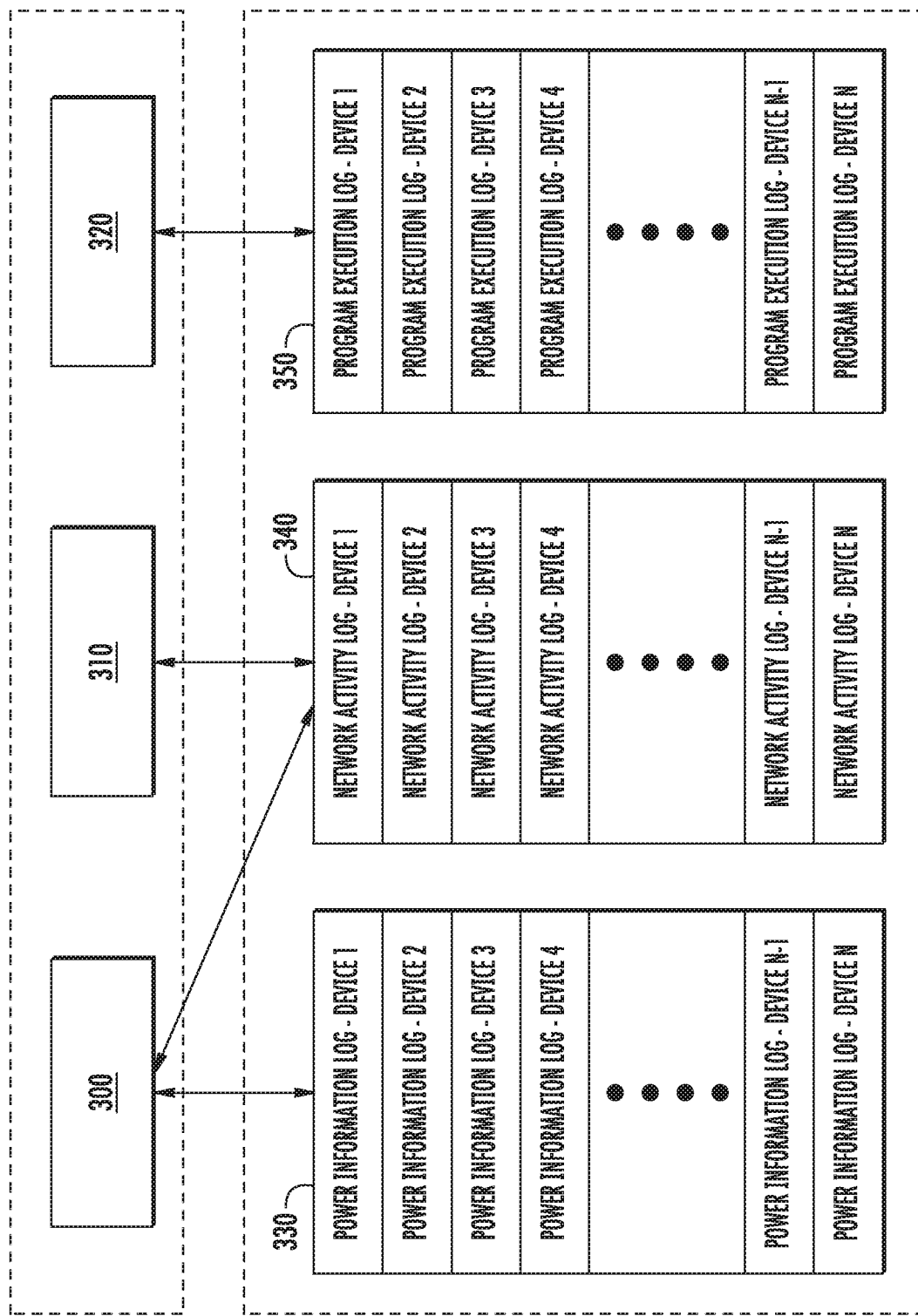
FIG. 4 illustrates the contents of the memory of the system monitoring device according to one embodiment.

FIG. 4 shows a schematic of the memory structure of the system monitoring device 100 according to one embodiment. The system monitoring device 100 may have a memory that contains at least three software applications; a multi-node Energy Profiler 300, a Network Analyzer 310 and a Debugger 320. These software applications may be stored in memory device 125 in certain embodiments. Each of these software applications may be able to access data that the system monitoring device 100 received from the network devices 10. In all embodiments, the software applications are stored in non-transitory storage media.

In certain embodiments, the system monitoring device 100 may store the power consumption information for each network device in a first data structure 330. This first data structure 330 may store the power consumption information separately for each network device. In one embodiment, each entry in the power consumption information log includes at least a timestamp and one piece of information regarding to the power consumption of the network device at that time. Of course, each entry may include more information, as desired.

The system monitoring device 100 may also store network activity for each network device in a second data structure 340. Like the first data structure 330, the second data structure 340 may store the network activity separately for each network device. In one embodiment, each entry in the network activity log includes at least a timestamp and one network transaction associated with the network device at that time. Of course, each entry may include more information, as desired.

Lastly, the system monitoring device 100 may also store program execution information for each network device in a third data structure 350. Like the first data structure 330, the third data structure 350 may store the program execution information separately for each network device. In one embodiment, each entry in the program execution log includes at least a timestamp and one program counter associated with the network device at that time. Of course, each entry may include more information, as desired.

The first, second and third data structures may be contained within the memory device 125 or in the second memory device 140. Regardless of the location of the data structures, it is noted that the software applications are able to access this information as needed.

FIG. 4 shows a representative illustration of the origination of the data structures in system monitoring device 100. It is understood that the data may be organized differently. For example, in a different embodiment, the data structures are organized by network device 10, rather than by data type. In this embodiment, all data associated with a single network device 10 is stored in one data structure. However, in all embodiments, the multi-node Energy Profiler 300, the Network Analyzer 310 and the Debugger 320 are able to access any data necessary to perform the functions described herein.

Figure 5:
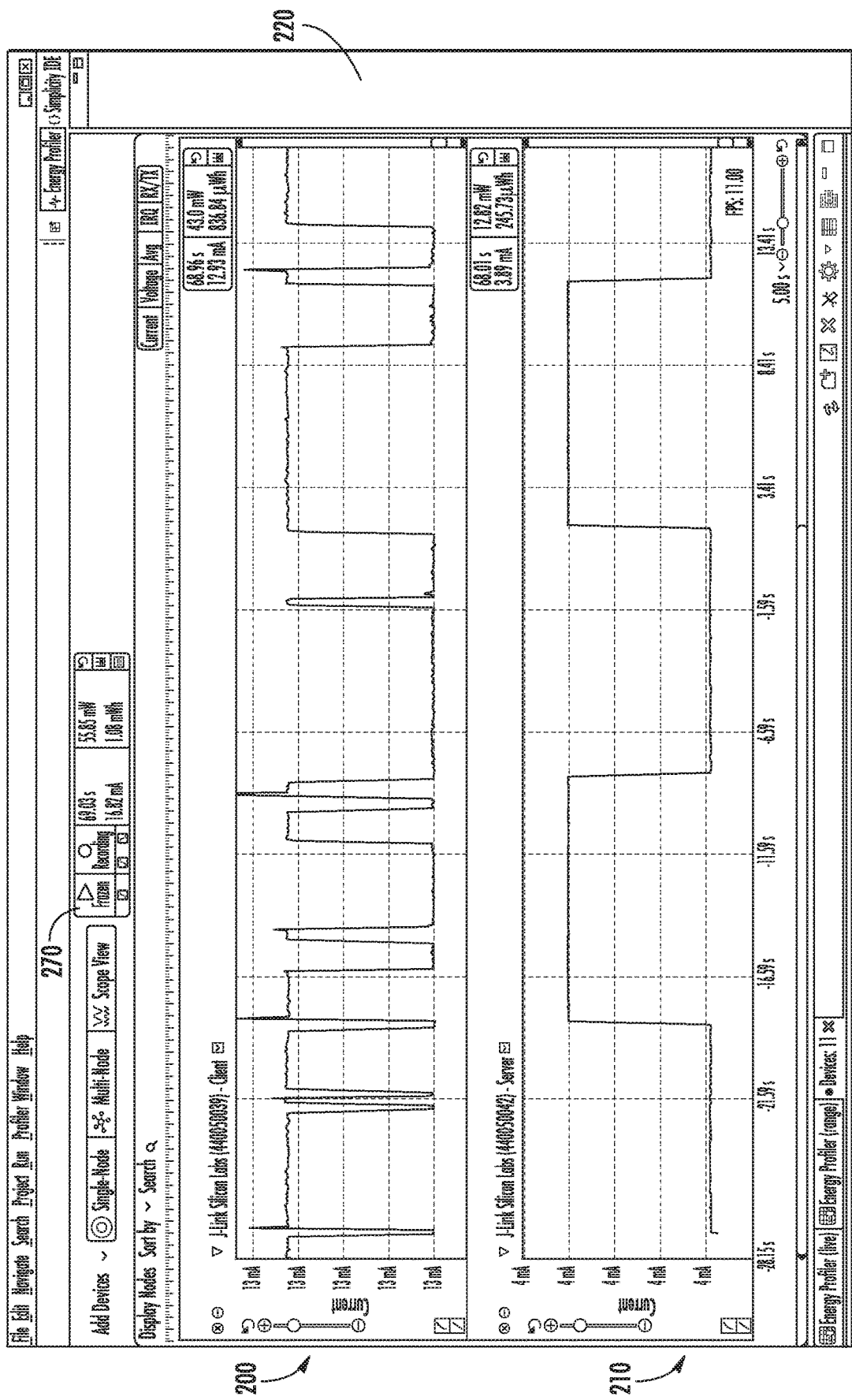
FIG. 5 shows a screen shot of the multi-mode Energy Monitor according to one implementation.

FIG. 5 shows an image that may be output to the display 160 by the system monitoring device 100. This image may be referred to as the multi-node Energy Profiler. In this image, the power consumption information for two network devices 10 is shown. The horizontal axis represents time, while the vertical access may be watts, amps, volts, or some other unit associated with power consumption. Additionally, power consumption information for more network devices 10 may be viewed by using the scroll bar located on the right side of the image. Further, in certain embodiments, the amount of vertical space assigned to each network device 10 may be customized. For example, in certain embodiments, the amount of vertical space associated with each of N network devices may be roughly 1/N of the total vertical height of the display. In other embodiments, the vertical space assigned to each network device may be fixed and additional network devices are viewed by scrolling. In FIG. 5, a first region 200 shows the power consumption information for a first network device, while a second region 210 shows the power consumption information for a second network device. As described above, a scroll bar 220 may be used to display power consumption information for additional network devices.

In certain embodiments, the multi-node Energy Profiler may allow a user to select some or all of the network devices 10 to be displayed on the display 160. For example, a dialog box may allow the user to select among a plurality of network devices 10.

Furthermore, in some embodiments, the vertical scale may be adjusted for each region of the screen independently. For example, a default setting may be 1 volt per division. However, by changing a setting, this scale can be expanded to 0.5 volts (or less) per division to allow better inspection of the power consumption of a particular network device 10. In certain embodiments, the multi-node Energy Profiler may include a mechanism to switch between a single network device view and a network view, where multiple network devices are shown.

Further, in certain embodiments, the multi-node Energy Profiler has the ability to display power consumption information for a certain time duration. In certain embodiments, this time duration may be extended or reduced to change the amount of information that is displayed on the display 160. New information is continuously displayed on the right side of the display, and stale information exits on the left side of the display. All of the information may be stored in a temporary file if desired.

Figure 6:
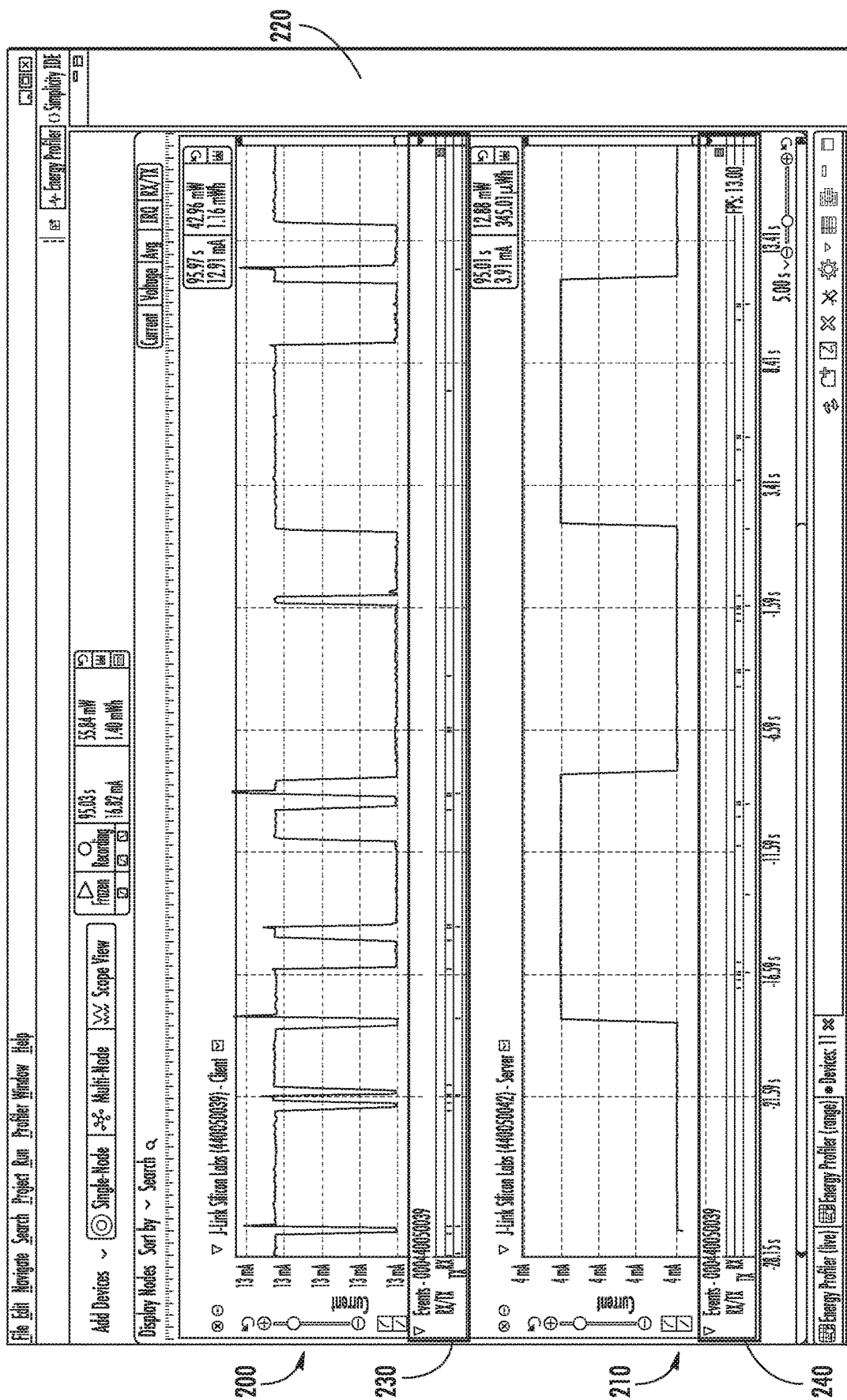
FIG. 6 shows a screen shot of the multi-mode Energy Monitor according to a second implementation.

In certain embodiments, additional information may be provided by the multi-node Energy Profiler. For example, as shown in FIG. 6, network activity may also be displayed. In FIG. 6, below the first region 200, which represents the power consumption information of a first network device is a representation of the network activity of that network device, as shown in highlighted box 230. Similarly, below the second region 210, which represents the power consumption information of a second network device is a representation of the network activity of that network device, as shown in highlighted box 240. In certain embodiments, the network activity is represented by two horizontal lines, one representing transmitted packets and the second representing received packets. The two lines are illuminated during those times that the network device is engaging in that activity. By displaying both power consumption information and network activity simultaneously, anomalies can be further investigated. For example, if the power consumption of a network device increases unexpectedly, this display allows the ability to understand if the change in power consumption correlates with specific network activity.

Figure 10:
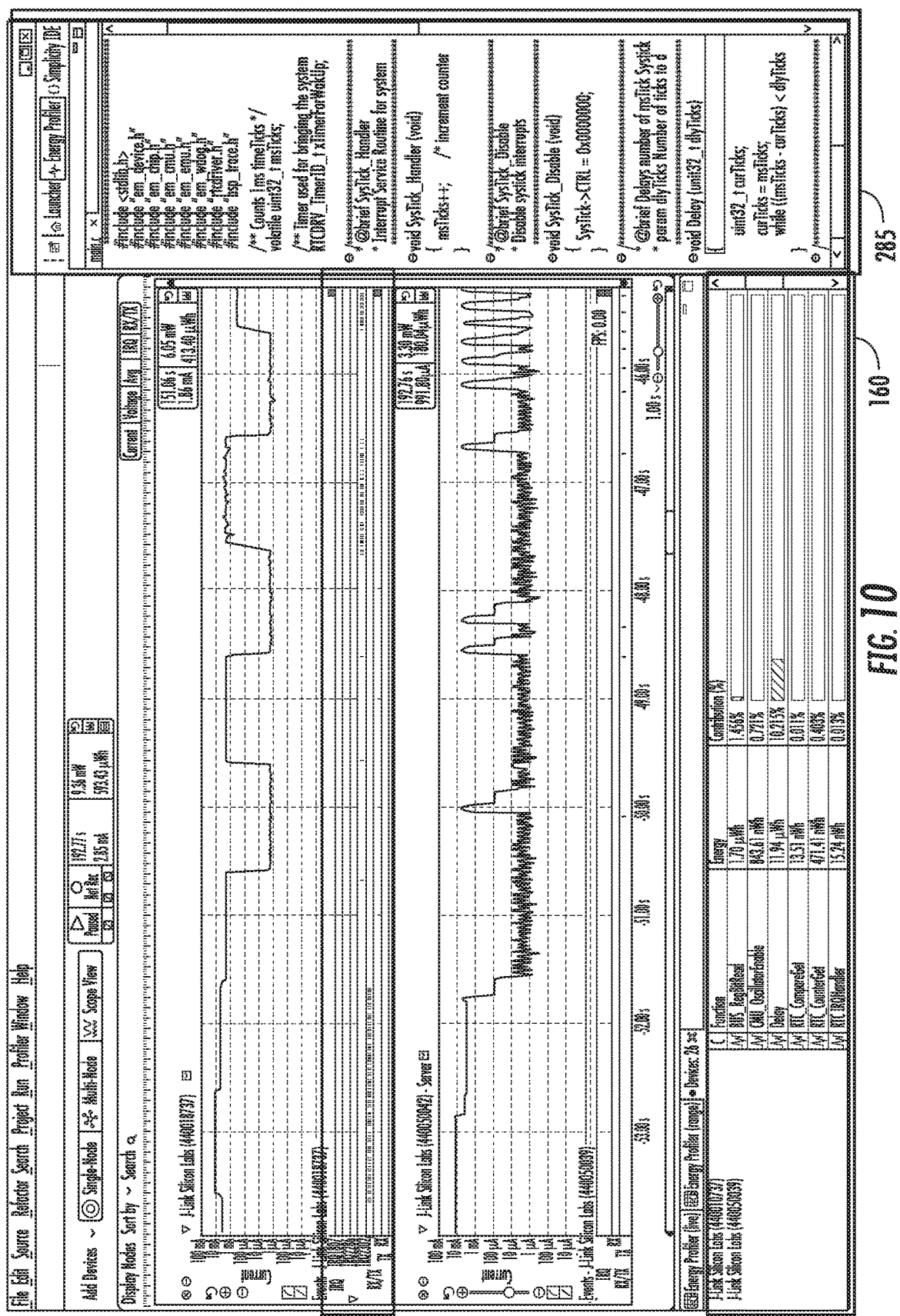
FIG. 10 shows a screen shot of the multi-mode Energy Monitor according to a third implementation.

Furthermore, as shown in FIG. 10, in certain embodiments, program execution information may also be shown on the display. For example, in one embodiment, a box 260 is shown on the display 160. This box may display interrupts, such that an indication appears in the box 260 anytime that particular network device 10 is executing an interrupt service routine. In certain embodiments, the interrupts can be separated such that each interrupt is displayed on its own line within box 260. For example, within box 260, there are 6 lines, each showing a specific interrupt. This may enable a user to better under the operation of the network device 10.

Furthermore, as shown in box 280, it is possible to display the names of the various functions that are executing in the network device 10. In addition to listing the names of these functions, the power consumed by the network device 10 while executing each function is also displayed. The power consumed by each function may be calculated by associating power consumption information with the function that was executing when that power consumption information was measured. In this way, the power consumption of each function can be calculated.

In certain embodiments, selecting one of the functions in box 280 may cause the code associated with that function to be displayed on the display 160, such as in box 285.

It is important to note that the exact location of each box is not limited by this disclosure and FIG. 10 shows one configuration that may be used to display this information.

The information displayed by the multi-node Energy Profiler is stored in a temporary file as it is received. In this way, it is possible for the user to pause or freeze the display to inspect a certain time interval. However, even while the display is paused, new information is being obtained and stored by the system monitoring device 100. Thus, the user can move forward and backward in time through the saved content, even as new information is being received. The multi-node Energy Profiler may include a "play/pause" indication 270 (see FIG. 5) that allows the user to freeze the display when desired. In some embodiments, the user may be able to permanently save the temporary file using a different name.

Another feature is the ability to set trigger conditions. For example, the multi-node Energy Profiler may continuously capture and display information. However, when the trigger condition is met, the multi-node Energy Profiler freezes the display and loads the information that occurred immediately after the trigger event. Another use of trigger capability would be to start or stop saving data to disk. Trigger events may include:
- power consumption for the entire network above or below a certain threshold;
- power consumption of a particular network device above or below a certain threshold;
- power consumption of any network device above or below a certain threshold;
- current for the entire network above or below a certain threshold;
- current of a particular network device above or below a certain threshold;
- current of any network device above or below a certain threshold;
- Occurrence of an event such as TX, RX, or IRQ; and
- Boolean combinations of all aforementioned criteria.

In addition to having triggers, the multi-node Energy Profiler may also incorporate a search mode. In this mode, the user may specify a search condition, similar to the types of activities that can be used for trigger events. The multi-node Energy Profiler will then search the entire temporary file and only display those portions of the temporary file that meet that search criteria. The multi-node Energy Profiler may also provide an indication of how many events met the search criteria and what percentage of the total temporary file is included in the search results.

Additionally, the multi-node Energy Profiler may calculate certain statistics, such as time duration, average current, average power consumption. This information may be calculated for the entire session or for each network device. In certain embodiments, these calculated statistics may be saved in a file for future use.

Figure 7:
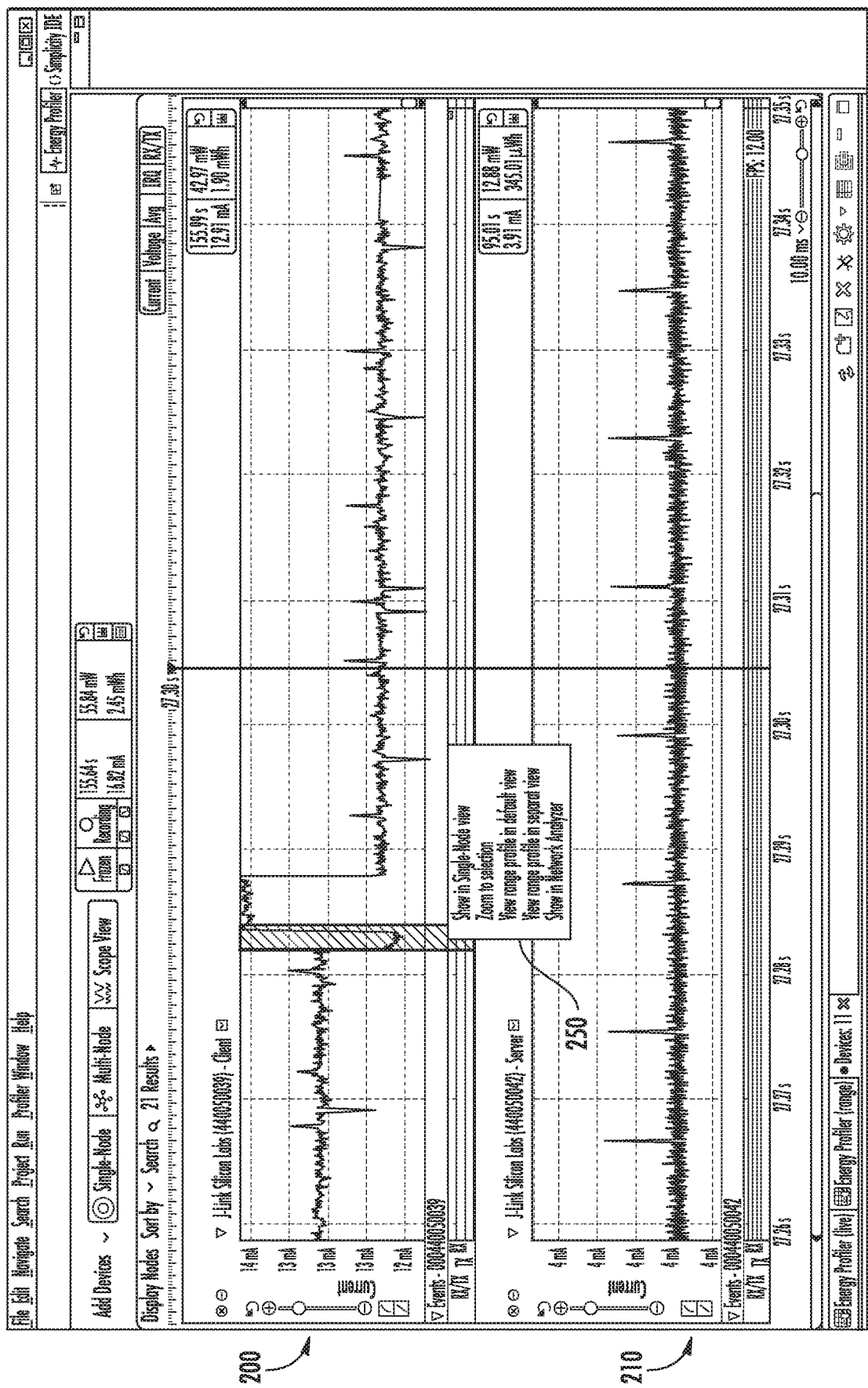
FIG. 7 shows a screen shot of the multi-mode Energy Monitor of FIG. 6 where a time interval is selected.

FIG. 7 shows a mechanism by which additional information can be viewed. For example, a user may identify a particular point in time that is of interest. Using the input device 170, the user can display more information that is available from this point on time. In one embodiment, the user may use the input device 170 to identify a time interval of interest. For example, the input device 170 may be a mouse, and the user may left click in two locations on the display to designate the start and end of the time interval of interest. Of course, the input device 170 may be used in other manners to provide this selection to the system monitoring device 100. In certain embodiments, the time interval of interest may correspond to a particular network activity, such as a transmission by a particular network device. In other embodiments, the time interval of interest may correspond to an abrupt change in power consumption for a particular network device. Of course, other time intervals may be selected. Once a time interval of interest is selected, the input device 170 may be used to select one of a plurality of viewing options. For example, FIG. 7 shows a representative screen shot where the user has used the input device 170 to display additional viewing options. For example, if the input device 170 is a mouse, a right click may cause the display window 250 of FIG. 7 to be displayed. The display window 250 may offer the user additional viewing options. These viewing options, but are not limited to:
- Show in single node view
- Zoom to selection
- Show in Network Analyzer
- Show in Debugger
- View range profile in default view
- View range profile in separate view The first option removes the non-selected network devices from the display. The second option expands the time interval of interest so that it encompasses the entirety of the multi-node Energy Profiler. The third option opens another software application, known as the Network Analyzer 310, which displays the network activity in greater detail. The fourth option opens a third software application, known as the Debugger 320, which displays the program execution information in greater detail. The fifth and sixth options are used to show the program execution details of a particular range on the display. In other words, after a range is selected by the user, the fifth and sixth options allow the user to display the data shown in box 280 (see FIG. 10) for that selected range.

Thus, the multi-node Energy Profiler 300, the Debugger 320 and the Network Analyzer 310 are each software applications, which can be executed independently, if desired. However, the present disclosure also describes an embodiment where these three software applications are linked together.

Figure 8:
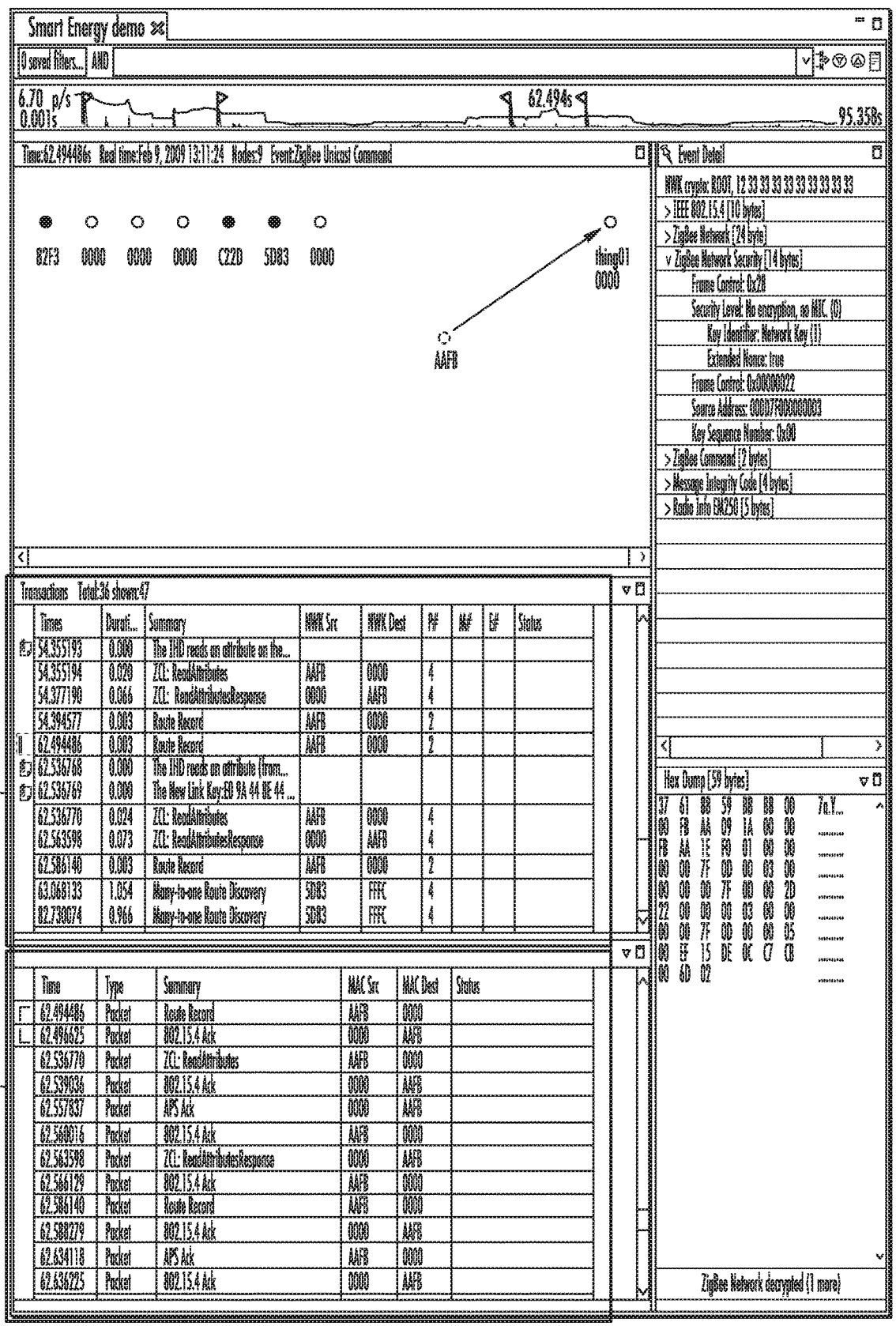
FIG. 8 shows a screen shot of the Network Analyzer according to one embodiment.

A screen shot of one embodiment of the Network Analyzer 310, which is referenced above, is shown in FIG. 8. The Network Analyzer 310 shows a sequential stream of packets which are being communicated between the network devices. Each packet originates from a specific network device, which is identified on the display. Packets from different devices are inter-mixed within the stream chronologically. In certain embodiments, the packets are arranged based on arrival time. Alternatively, the packets may be arranged based on transmit time, or some other metric. In certain embodiments, selecting a particular packet, such as via the input device 170, allows the user to see additional details regarding that packet. In certain embodiments, selecting a particular packet that arrived at a particular network device displays all packets received by that network device. In certain embodiments, the Network Analyzer 310 may display the time of a transaction, the duration of that transaction, a summary of the transaction, and the source and destination addresses (either as MAC addresses or as IP addresses). This is shown in box 315. Further, in certain embodiments, the user may select one of the transactions, such as by using the input device 170. The events that make up that transaction are then displayed, as shown in box 317. The details of the events may include the time of the event, the type of event that occurred, a summary of the event, and the source and destination addresses that participated in the event.

Figure 9:
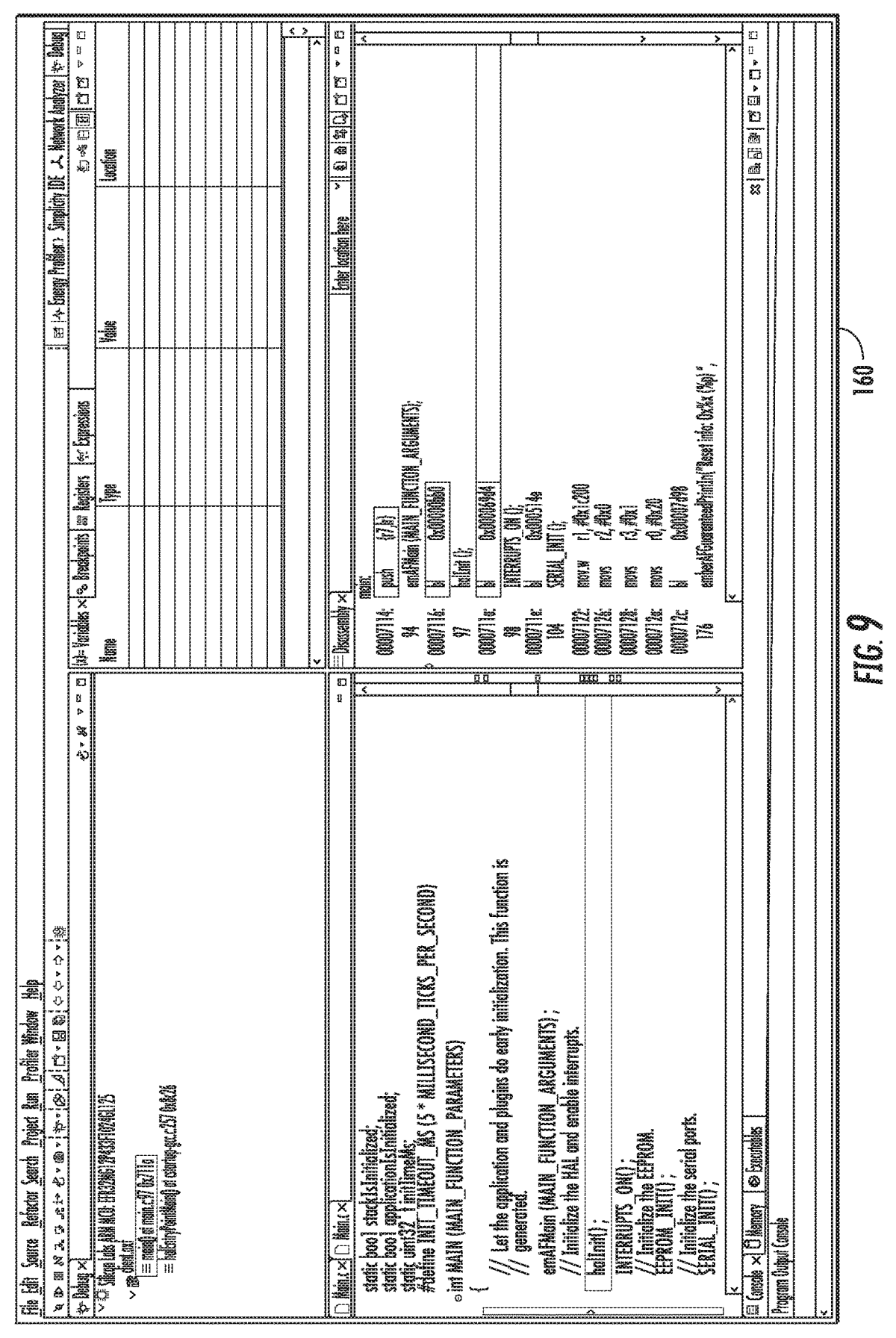

FIG. 9 shows a screen shot of one embodiment of a Debugger 320, which was referenced above. Using the program execution logs received from each network device, the system monitoring device 100 may be able to display the program counter for each instruction that was executed by each network device. In certain embodiments, the network device may not provide information for each instruction executed. In these cases, the Debugger 320 displays the program execution information that was provided.

Advantageously, in certain embodiments, the Debugger 320, Network Analyzer 310 and the multi-node Energy Profiler 300 can be linked together, such that selection of a particular time interval in one software application causes the other two software applications to also show information associated with that time interval.

Thus, in certain embodiments, a user may display output from all three software applications simultaneously on one display 160, or on a plurality of displays 160. As described above, these software applications may be linked together so that the selection of a particular time interval on one software application causes the other two software applications to display the same time interval.

The system described herein has many benefits. These include:

Direct correlation of high and low power consumption events with specific network packets;

Focus on specific sections of code responsible for increasing or decreasing power consumption;

Synchronization of source code debugging with energy monitoring and network activity;

Evaluation of power performance of an entire network as a way to optimize single device power performance; and Evaluation of power performance of an entire network as a way to optimize entire network power performance.

The ability to monitor multiple network devices simultaneously offers advantages not previously possible. For example, assume a network comprising fifty devices together. The present system allows analysis of all of the device operating as a network to identify if any one of them is operating at higher power than the others, even though the devices are all running the same code. In some cases, a device may not exhibit this problem with a smaller number of devices. In certain cases, the device that exhibits this problem could vary based upon test conditions. The ability to monitor all of the devices in a network simultaneously allows these issues to be investigated in a way that was not previously possible.

While the present disclosure described the advantages of monitoring a network comprising a plurality of network devices, it is understood that the present disclosure can also be used to monitor a plurality of devices that are not part of a network. For example, assume a company creates a product that uses several devices. These devices may work in concert with each other in response to user input or stimulation from the environment, but not necessarily as part of a network communicating with each other. A developer of that product would benefit from the multi-node Energy Profiler 300 to optimize power of the entire system. The developer may use the debugger to observe what code is executing in association with power performance, but may not use network analyzer in that design. Thus, the present disclosure is useful in these scenarios as well.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for displaying information about a plurality of devices, comprising:

the plurality of devices, where each device comprises a first network interface in communication with a wireless network and a second network interface in communication with a debug network, different from the wireless network; and a system monitoring device, in communication with each of the plurality of devices via the debug network, and comprising a display;

wherein each device periodically measures its power consumption and transmits power consumption information to the system monitoring device via the debug network;

wherein each device generates program execution information by monitoring a program counter of a processing unit, and transmits the program execution information, which includes a plurality of saved program counter values, to the system monitoring device via the debug network; and the system monitoring device displays the power consumption information for at least two of the plurality of devices on the display and program execution information for at least one of the plurality of devices, wherein the power consumption information is correlated with the program execution information.

2. The system of claim 1, wherein the power consumption information is transmitted from each device with a timestamp, and clocks of all devices are synchronized such that the system monitoring device synchronizes the power consumption information received from each device.

3. The system of claim 1, wherein a trigger condition may be set in the system monitoring device, such that when the trigger condition is met, the system monitoring device performs an action.

4. The system of claim 3, wherein the action comprises starting to store the power consumption information.

5. The system of claim 3, wherein the action comprises displaying the power consumption information.

6. The system of claim 3, wherein the action comprises ceasing to store the power consumption information.

7. The system of claim 1, wherein new power consumption information is continuously received and displayed on the display.

8. The system of claim 7, wherein the display comprises a play/pause indication, which when actuated by a user, freezes the display.

9. The system of claim 1, wherein all power consumption information is stored in a temporary file such that information that is not visible on the display can be retrieved.

10. The system of claim 1, wherein the program execution information comprises a graphical display of interrupts that occur in the device.

11. The system of claim 1, wherein the program execution information comprises a histogram showing a percentage of power consumed by each function on the device.

12. The system of claim 1, wherein the plurality of devices communicate with each other using the wireless network via the first network interface.

13. The system of claim 12, wherein the plurality of devices transmit network logs to the system monitoring device using the debug network, wherein the network logs comprise entries for packets transmitted and received using the wireless network.

14. The system of claim 13, wherein the system monitoring device also displays network activity for at least one of the plurality of devices on the display.

15. The system of claim 14, wherein selection of a particular device causes the system monitoring device to open a new window showing details concerning network activity of the particular device.

16. A system monitoring device, comprising:
a network interface to communicate with a plurality of devices using a debug network, wherein the plurality of devices are also in communication with a wireless network, different from the debug network;
a display; and
a processing unit,
wherein the system monitoring device receives power consumption information, program execution information, which includes a plurality of saved program counter values, and network logs from the plurality of devices via the network interface, displays the power consumption information from at least two of the plurality of devices on the display; and also displays the program execution information and/or the network logs from at least one of the devices, wherein the power consumption information is correlated to the program execution information and/or the network logs.

17. The system monitoring device of claim 16, wherein a trigger condition may be set in the system monitoring device, such that when the trigger condition is met, the system monitoring device performs an action.

18. The system monitoring device of claim 17, wherein the action comprises starting to store the power consumption information.

19. The system monitoring device of claim 17, wherein the action comprises displaying the power consumption information.

20. The system monitoring device of claim 17, wherein the action comprises ceasing to store the power consumption information.

21. The system monitoring device of claim 16, wherein the display comprises a play/pause indication, which when actuated by a user, freezes the display.

22. The system monitoring device of claim 16, wherein all power consumption information is stored in a temporary file such that information that is not visible on the display can be retrieved.

23. The system monitoring device of claim 16, further comprising a memory device, the memory device containing software applications.

24. The system monitoring device of claim 23, wherein the software applications comprise a multi-mode Energy Profiler, a Network Analyzer and a Debugger.

25. A software application stored on a non-transitory storage media, comprising instructions which when executed by a processing unit, enable a system monitoring device to:
receive power consumption information from a plurality of devices via a network interface using a debug network, wherein the plurality of devices are also in communication with a wireless network, different from the debug network;
receive network activity logs from the plurality of devices via the network interface;
receive program execution information, which includes a plurality of saved program counter values, from the plurality of devices via the network interface;
display the power consumption information from at least two of the plurality of devices on a display; and also display the program execution information and/or the network logs from at least one of the devices, wherein the power consumption information is correlated to the program execution information and/or the network logs.

26. The software application of claim 25, wherein the instructions enable the system monitoring device to display program execution information on the display.

27. The software application of claim 25, wherein the instructions enable the system monitoring device to display network activity on the display.

28. The system of claim 1, wherein the debug network is a wired network.

* * * * *